Patented July 7, 1931

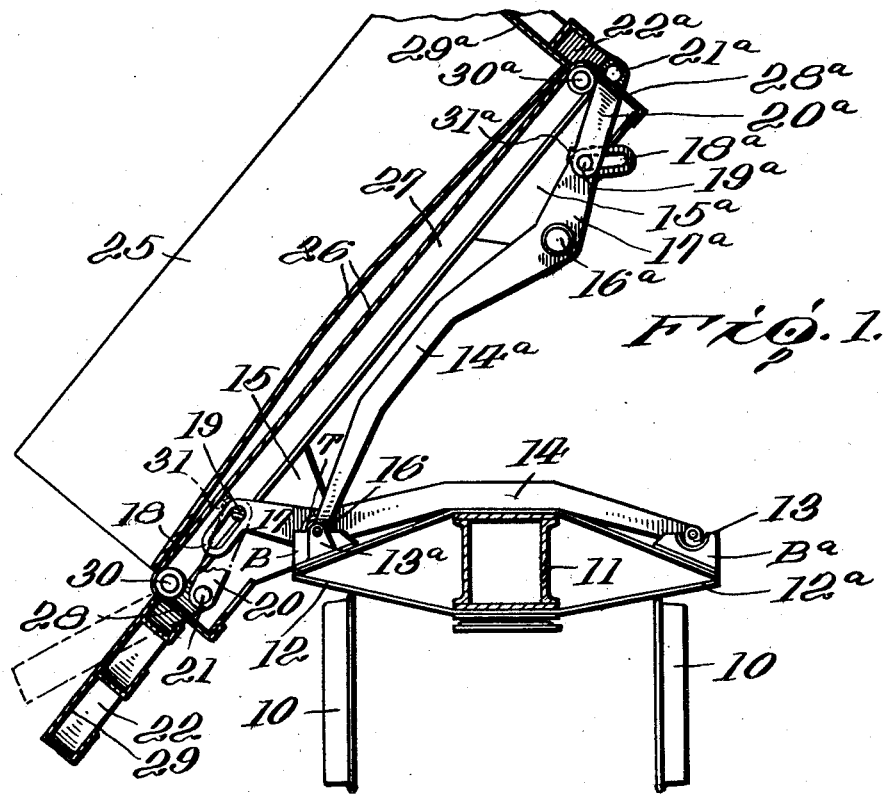
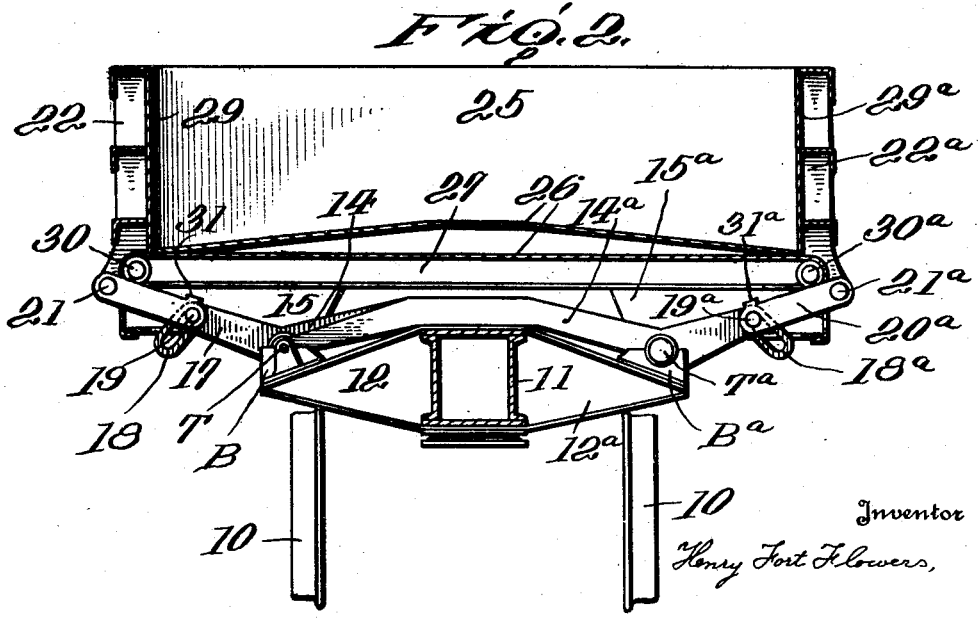

1,813,570

UNITED STATES PATENT OFFICE

HENRY FORT FLOWERS, OF FINDLAY, OHIO

DUMP VEHICLE WITH ACTUATED DOORS

Application filed July 10, 1926. Serial No. 121,689.

This invention relates to improvements in dump vehicles, and more particularly to door controlling mechanisms for such vehicles.

In my copending applications Ser. No. 740,307 filed Sept. 27, 1924 now Patent No. 1,611,012, granted Dec. 14, 1926, and Ser. No. 66,791 filed Nov. 4, 1925, I have disclosed means for holding a dump body to a frame, and presenting door actuating devices capable of holding side doors closed during transport and during dumping to the opposite side in case of a two-way dump, and for positively returning an opened door after dumping and during the return of the body from tilted position.

According to the present invention, an improved door actuating device is established, in which the door is free to move independently of the body during dumping for the purpose of avoiding strains upon the mechanism as a whole and upon its parts; and yet the door is positively actuated during the return. The door, during opening, need only be controlled to prevent too abrupt a movement, but it is preferred to regulate the opening in the same manner employed in the devices of my aforesaid applications, in that the gravitational movement is checked and controlled by the door controlling device.

As before, the doors are positively held closed at all times except during dumping to the respective side of the vehicle.

A door controlling mechanism of such type is illustrated in one embodiment on the accompanying drawings as attached to a vehicle, in this instance a railway car, and is shown in:

Figure 1 in transverse section through the car with the dump body tilted.

Fig. 2 in similar section, with the dump body in normal transport position.

In these drawings, the vehicle is represented in Fig. 1 as tilted about the left-hand trunnion or fulcrum; and hence the left-hand side door is to be controlled for its opening and closing movements while the right hand side door is to be held closed. Hence, the plain reference characters will be used to refer to parts about which the body moves, and for controlling the left hand door, while the corresponding members on the other side will be referred to by the same characters with the superscript $a$.

The vehicle is represented as being supported by the wheels 10, 10 which are carried on appropriate trucks (not shown) and thereby support the underframe 11, which has the lateral brackets 12 and $12^a$ at either side. These brackets respectively support the blocks B, $B^a$ for the trunnions 16, $16^a$ and the pivot standards 13 and $13^a$, which are pivotally connected to the transverse bars 14 and $14^a$ extending laterally across the frame from one side to the other and pivotally connected to the downwardly directed gusset plates 15 and $15^a$ of the body at distances from the centers of the respective brackets 13, $13^a$ which are equal to the distance between the centers of the brackets 13, $13^a$, so that when the car is in a normal transport position as shown in Fig. 2, the pivot connections between the arm 14 and the body and between the arm $14^a$ and the body are alined with the respective pivot points of the other arm with the under frame, and determine the trunnion line T, $T^a$. The gusset plates 15, $15^a$ and the trunnion points or fulcrums 16, $16^a$ thus form attachments on the body for establishing a cooperative relationship between the body, the transverse arms, and the links 20, $20^a$.

Beyond the trunnion points 16, $16^a$, the arms 14 and $14^a$ are each prolonged by an integral portion 17, $17^a$ which at its end has formed therein a slot 18, $18^a$ which receives the pin 19 or $19^a$ carried by the respective link 20 or $20^a$, which in turn is pivoted at 21 or $21^a$ to depending members formed with the door bracing irons 22, $22^a$. The slots 18, $18^a$ are preferably so formed that at all positions of the body with respect to the frame, when tilting to the adjacent side, the distance from the pivot point 21 or $21^a$ to one end of the slot, here the upper inner end, is greater than the distance to the other: in this way the link 20 or $20^a$ does not tend to rock downward at any time.

The car body or bed comprises the end sheets 25, the floor plates 26, and the supporting beams 27 extending transversely across the car beneath the floor plates, some of which are secured to the gusset plates 15, 15ᵃ to stiffen the latter. One floor plate 26 extends across the car floor, and is bent downwardly and then inwardly at its outer edges to form stiffening flanges 28 and 28ᵃ on the respective sides of the car. The door stiffening irons 22, 22ᵃ support the door plates 29, 29ᵃ, and may rock about the pivot points 30, 30ᵃ for opening or closing these doors or gates.

Integral portions 31, 31ᵃ are provided at the inner ends of the respective links 20, 20ᵃ, and serve to prevent the pins 19, 19ᵃ of these links moving downward in the slots 18, 18ᵃ, except after a relative rocking movement of the respective link and arm. When the body is in normal transport position as in Fig. 2, if a heavy blow be struck against the outer side of either door, as by a swinging steam shovel bucket, and the door be rocked inwardly thereby, the link 20 or 20ᵃ cannot rock to present its pin at the bottom of the respective slot, since the portion 31, 31ᵃ rides on the top of the respective arm: and the door controlling mechanism serves to prevent an inward collapsing of the door in such event. The same effect is produced with regard to the upper door in tilting. The lower door however, by reason of the relative rocking of the link and arm, is afforded a permissive movement upon encountering an obstacle. The exact positioning of the slots may be varied in the presence of the portions 31, 31ᵃ.

The method of operation of this device is as follows: When the car is in the normal or transport position as shown in Fig. 2, the car body is supported solidly at both trunnion lines T and Tᵃ, by the engagement of the trunnions pins 16, 16ᵃ on the blocks B, Bᵃ, so that the load may not be discharged accidentally by the releasing of any latch. The position of the pins 19, 19ᵃ in the slots 18, 18ᵃ is such that the links 20 and 20ᵃ are substantially in prolongation of the arms 17, 17ᵃ and thereby serve to hold the doors 29, 29ᵃ closed: any downward movement of the pin 19 or 19ᵃ is prevented both by the integral portions 31, 31ᵃ of the links 20, 20ᵃ and by the shorter distance between the pivot point 21 or 21ᵃ to the lower end of the slot 18, 18ᵃ than to the upper end of this same slot, as set forth above.

Upon arriving at the proper point for dumping, either side of the car body may be raised above the trunnion T or Tᵃ at the opposite side of the car body into a tilted position such as that shown in Fig. 1 in which the body is raised about the trunnion T. This tilting may be accomplished by a power mechanism upon the car, or by devices along the right-of-way. In this tilting movement, the transverse arms 14 remain in fixed relation to the underframe while the transverse arms 14ᵃ remain in fixed relation to the car body: this relation is possible since the arms 14, 14ᵃ are all pivoted both to the underframe and to the body substantially at the trunnion lines T, Tᵃ. It will be noted in Fig. 2 that at the beginning of the tilting in either direction, the corresponding door will be operated by its control device so that an initial positive opening is effected, prior to the passage of the stop member 31, 31ᵃ from the upper side of the prolongation 17, 17ᵃ to the outer side of the portion of the respective arm having the slot 18, 18ᵃ. This positive connection formed momentarily by the stop member 31, 31ᵃ lasts for only a short interval of time, until, by the relative rocking of the link 20 or 20ᵃ about the pin 19, 19ᵃ, the stop 31, 31ᵃ is able to slide along the slotted extension of the respective arm.

The body in tilting causes the pivot point 30 of the door at the lower side thereof to move downward and to a greater distance from the upper end of the slot 18. The link 20 therefore may move inward and permit the door 29 to fall downward by gravity in proportion as the body is tilted and when in the extreme position of tilting shown in Fig. 1, the door plate is presented in substantial alinement with the floor plates 26, and the door forms a chute for the discharge of the contents of the body.

If at any time the door 29 encounters some obstacle such as a stone or the like in its downward movement in conjunction with the body, it is retained thereby and prevented from further downward movement at the contacting point, and as the body continues to tilt, the bolt 19 moves downward in the slot 18 as a lost motion connection. This prevents any breakage or damage to the door actuating system.

When the body is again moved downward mechanically or by gravity at its raised side, to be returned into the normal transport position shown in Fig. 2, the bolt 19 comes into contact with the upper end of the slot 18 and link 20 is subjected to a compression in its length and thereby forces downwardly and outwardly upon the pivot 21 and thereby upon the door 29 and causes a positive return of the latter into its closed position. If the door has been prevented from moving into the fully extended position shown in Fig. 1, and the bolt 19 is not at the upper end of the slot 18, then as the body returns the bolt 19 is successively moved along the slot until it encounters its upper end, and thereupon the closing operation for the door is the same as that set forth above.

During this whole maneuver of tilting and returning, the transverse arm 14ᵃ has remained in the same relative position to the car body as it occupied during the normal transport by rotating about the trunnion line T; and the members 17ᵃ and the links 20ᵃ have held the upper door 29ᵃ in the closed position positively.

This construction permits a positive closing of the door at all times by the downward movement of the body in returning from tilted dumping position, and at the same time permits the door to move freely with respect to the body in case some obstacle is encountered during the tilting movement.

The provision of means whereby the door is permitted to relatively close during a tilting of the body for dumping is claimed broadly in my copending application Ser. No. 100,577, filed April 8, 1926.

I claim:

1. In a dump vehicle, a frame, a dump body tiltable for dumping to either side about fulcrums at the sides of said frame, said dump body being supported in stable equilibrium upon said fulcrums during normal transport, side doors for said dump body pivoted thereto, and independent, automatic and selective door controlling devices for said doors located beneath said body and extending across said frame, said devices including members having a slot-and-bolt connection to assure a permissive opening of the associated door during the tilting of said body about the adjacent fulcrum, and a positive closing of said door during the return of said body from tilted position.

2. In a dump vehicle, a frame, a dump body tiltable for dumping to either side about fulcrums at the sides of said frame, said dump body being supported in stable equilibrium upon said fulcrums during normal transport, side doors for said dump body pivoted thereto, and independent, automatic and selective door controlling devices for said doors, said devices being connected to said frame substantially at the fulcrum at the opposite side of the frame from the controlled door and including a slot-and-bolt connection with said respective door whereby said door may move independently of said dump body during the tilting of said dump body about the adjacent fulcrum.

3. In a dump vehicle, a frame, a dump body tiltable for dumping to either side about fulcrums at the sides of said frame, said dump body being supported in stable equilibrium upon said fulcrums during normal transport, side doors for said dump body pivoted thereto, transverse bars extending across said frame and connected alternately to the said fulcrums, links pivoted to said doors, means on said links to cooperate with those of said bars which are connected to the opposite side of said frame, said bars having slots to receive said means, and means to prevent the movement of said cooperating means in said slots except during the tilting of said body about the fulcrum adjacent the respective door.

4. In a dump vehicle, a frame, a dump body tiltable for dumping to either side about fulcrums at the sides of said frame, said dump body being supported in stable equilibrium upon said fulcrums during normal transport, side doors for said dump body pivoted thereto, transverse bars extending across said frame and connected alternately at opposite ends thereto substantially at the said fulcrums, links pivoted to said doors, said bars having outwardly and downwardly directed slots at their free ends, means on said links to engage said slots whereby said links lock said doors closed during normal transport, said means moving in said slots during the tilting of the dump body about the fulcrum adjacent the respective door to permit said door a movement independent of said body.

5. In a dump vehicle, a frame, a dump body tiltable for dumping to either side about fulcrums at the sides of said frame, said dump body being supported in stable equilibrium upon said fulcrums during normal transport, side doors for said dump body pivoted thereto, and transverse bars connected alternately at opposite sides of said frame, links to connect the free end of each of said bars to the adjacent door, said bar connected to the door at the side adjacent the fulcrum selected for tilting remaining stationary with the frame during tilting, and the bar connected to the opposite door turning with the dump body during tilting, said link connections having a permissive lost motion to allow said respective door to move independently of said body during tilting about the adjacent fulcrum.

6. In a dump vehicle, a frame, a dump body tiltable for dumping to either side about fulcrums at the sides of said frame, said dump body being supported in stable equilibrium upon said fulcrums during normal transport, side doors for said dump body pivoted thereto, and a door controlling device for each of said doors connected to said frame at the side opposite said door and including a slot-and-bolt connection and a link carrying said bolt, said link being pivoted to said respective door, said slot being inclined to the center line between the respective door pivot and the adjacent fulcrum and the upper end of the slot being a greater distance from the connection of said link and door than the lower end thereof.

7. In a dump vehicle, a frame, a dump body tiltable for dumping to either side about fulcrums at the sides of said frame, said dump body being supported in stable equilibrium upon said fulcrums during normal transport, side doors for said dump body being pivoted thereto, and a door controlling device for each of said doors connected to said frame at the side opposite said door and including a slot-and-bolt connection and a link carrying said bolt, said link being pivoted to said respective door, the upper end of the slot being a greater distance from the connection of said link and door than the lower end thereof.

8. In a dump vehicle, a frame, a dump body tiltable for dumping to either side about fulcrums at the sides of said frame, said dump body being supported in stable equilibrium upon said fulcrums during normal transport, side doors for said dump body pivoted thereto, transverse bars extending across said frame and connected alternately to the said fulcrums, links pivoted to said doors, means on said links to cooperate with those of said bars which are connected to the opposite side of said frame, said bars having slots to receive said means, and a stop on each of said links extending into the path of said respective bar to prevent the movement of said cooperating means in said slots except during the tilting of said body about the fulcrum of the adjacent respective door.

9. In a dump vehicle, a frame, a dump body tiltable for dumping to either side about fulcrums at the sides of said frame, said dump body being supported in stable equilibrium upon said fulcrums during normal transport, side doors for said dump body pivoted thereto, a door controlling device for each of said doors connected to said door, said frame and said body and including a connection between said frame and said door having a permissive lost motion to allow the said respective door to move independently of said body during tilting about the adjacent fulcrum, and means to hold such connection against such lost motion in all other positions of said body so that said respective door is held stationary relative to said body.

10. In a dump vehicle, a frame, a dump body tiltable for dumping at either side about fulcrums at the sides of said frame whereby said dump body is supported in stable equilibrium during normal transport, side doors for said dump body pivoted thereto at the respective sides, and door controlling mechanisms connected to said frame and to the respective doors to automatically, independently and selectively control the entire opening movement of the respective door during tilting toward the side adjacent said door, said mechanisms permitting the door to yield upon encountering an obstruction, and means to block said permissive yielding at the beginning of the said tilting whereby an initial positive opening effort is exerted upon the door.

11. In a dump vehicle, a frame, a dump body tiltable for dumping to either side about fulcrums at the side of said frame, said dump body being supported in stable equilibrium upon said fulcrums during normal transport, a side door pivoted at each side of said dump body, and transverse bars connected alternately at opposite sides of said frame substantially in said respective fulcrum lines, links to connect the free end of each of said bars to the adjacent door, said bar connected to the door at the side adjacent the fulcrum selected for tilting being held by its frame connection during tilting toward the side adjacent its respective door so that its free end moves relatively to said body to effect a controlled opening of the respective door, and so that the bar connected to the opposite door turns with the dump body during such tilting, said links and bars permitting the respective door to move independently of said body during tilting about the adjacent fulcrum so that the respective door is relieved from strain upon encountering an obstacle during such tilting.

12. In a dump vehicle, a frame, a dump body tiltable for dumping to either side about fulcrums at the sides of the frame, said dump body being supported in stable equilibrium upon said fulcrums during normal transport, side doors for said dump body pivoted thereto, and independent, automatic and selective door controlling devices for said doors, said devices including members cooperating with said doors and said frame and including slot-and-bolt connections to assure a permissive opening of the door at the lower side during the tilting of the body and a positive closing of the door during the return of the body from tilted position.

13. In a dump car, an underframe, a dump body mounted on trunnions near each side of said body, doors hinged at the sides of said body, means for permitting the arresting of the opening door on the dumping side independent of the continued tilting of the body and for closing and locking said door when the body is returned to a horizontal position, said means comprising a member connected to said door and to the opposite side of said underframe.

14. In a dump car, an underframe, a dump body mounted on trunnions near each side of said body, doors hinged at the sides of said body, transverse means connected near each side of said frame, and to opposite doors, said means limiting the opening but not the closing of the door by the tilting of the body.

15. In a dump car, an underframe, a dump body mounted on trunnions near each side of said frame, doors pivotally mounted at the sides of said body, transverse members connected near each side of said frame and extending to the opposite door, downward depending arms on said door, links connecting said transverse members and downward depending arms, attachments on said body cooperating with said transverse members to control the vertical movement of said members, said links and attachments cooperating with said transverse members and downward depending arms to lock the doors in a closed position with the dump body horizontal and to permit closing of the lower door when the body is in a tilted position.

16. In a dump car, an underframe, a dump body, doors pivotally mounted at the sides of said body, transverse members connected near each side of said underframe and to the doors at the opposite side, attachments on said body cooperating with said members to lock the doors closed with the body horizontal, to maintain the upper door closed as the body is tilted and to limit the opening but not the closing of the discharging door by such tilting.

17. In a dump car, an underframe, a dump body, doors pivotally mounted at the sides of said body, transverse members connected near each side of said underframe and to the opposite doors, attachments on said body cooperating with said members to lock the doors closed with the body horizontal, to maintain the upper doors closed as the body is tilted, to limit the opening but not the closing of the discharging door by such tilting and to close and lock such door with the return of said body to a horizontal position.

18. A dump car comprising an underframe, a tilting bed mounted thereon for rocking movement about laterally spaced fulcrums, a side gate connected with the bed to open downwardly, and operating mechanism for controlling the opening of the gate in dumping comprising a pivoted member which, by its position relative to said bed, limits the downward movement of the gate while permitting upward movement thereof, and an arm pivotally connected to said underframe and arranged to control the position of said pivoted member relative to said bed.

19. A dump car comprising an underframe, a tilting bed mounted thereon to rock about a fulcrum at one side of the underframe, a side gate connected with the bed to open downwardly, and means for controlling the opening of the gate in dumping comprising a pivoted member which, by its position relative to said bed, limits the downward movement of said gate while permitting upward movement thereof, and a link connected between said pivoted member and the opposite side of said underframe for controlling the position of said pivoted member relative to said bed.

20. A dump car comprising an underframe, a tilting bed mounted thereon for rocking movement in either direction on two laterally spaced fulcrums, side gates connected with the opposite sides of the bed to open downwardly, and means for controlling the opening of each gate in dumping comprising a pivoted member which, by its position relative to said bed, limits the downward movement of the corresponding gate while permitting upward movement thereof, and a link connected at one end to said pivoted member and connected at the other end with said underframe adjacent to one of said fulcrums.

21. A dump car comprising an underframe, a tilting bed mounted on said underframe on two rocking fulcrums spaced laterally from the center of said underframe, said bed being adapted for lateral dumping movement in either direction about one or the other of said fulcrums, side gates connected with the opposite sides of the bed to swing downwardly into open position, and gate controlling mechanism normally operative to permit movement of the gate on the dumping side of said bed to open position, said gate controlling mechanism comprising a lost motion connection between the gate and the underframe permitting said mechanism to complete its operating movement independently of the completion of the opening movement of the gate.

22. In a dump vehicle, a frame, a dump body supported in stable equilibrium upon widely spaced fulcrums on said frame during normal transport and adapted to be raised at either side about a fulcrum at the opposite side for dumping to said opposite side, downfolding side doors pivoted at the sides of said body and adapted to open by gravity as the body tilts for dumping, and independent, automatic and selective door controlling devices for each door, each of said devices being connected to its respective door for exerting an initial positive opening movement upon said door when the body begins to tilt about a fulcrum adjacent said door, and thereafter liberating the door for gravitational opening during the continued tilting of the body, for positively closing said door during the return of the body from tilted position, and for maintaining said door closed during tilting toward the opposite side and during transport.

23. In a dump vehicle, a frame, a dump body tiltable for dumping, downfolding side doors for said dump body pivoted thereto, an automatic and selective door controlling device for each door for exerting an initial positive opening effort upon the lower door during the first part of the tilting movement of the body, and for thereafter permitting the door to move to open position by gravity as the door continues to tilt whereby the door may close relative to the body upon encountering an obstruction, while controlling the maximum rate of opening of the door for the entire movement, said devices operating during the return of the body from tilted position to move the lower door into closed position and serving to hold both doors closed during normal transport and to hold the upper door closed during tilting.

24. In a dump vehicle, a frame, a dump body supported in stable equilibrium upon widely spaced fulcrums on said frame during normal transport and adapted to be raised at either side about a fulcrum at the opposite side for dumping to said opposite side, downfolding side doors pivoted at the sides of said body and adapted to open by gravity as the body tilts for dumping, each of said doors including an extension normally depending below the door pivot, and independent, automatic and selective door controlling devices for each door, each including a link pivoted to said depending extension and a member pivoted to the frame adjacent said dumping fulcrum at the side opposite the associated door and also pivoted to said link, said body cooperating with one of said devices during tilting to hold the upper door closed, holding the member of another device substantially rigid with the frame and operating during the tilting movement to move the door away from the pivotal connection between the link and member of said other device whereby an initial opening pull is exerted upon said door from the frame through said member and link, each of said devices including means for permitting said door to close relative to the body upon encountering an obstruction during tilting and operating during the return of the body from tilted position to transmit a thrust to said door.

25. In a dump vehicle, a frame, a dump body tiltable for dumping at either side about widely spaced fulcrums at the sides of said frame, downfolding side doors for said dump body pivoted thereto at the respective sides, and door controlling mechanisms connected to the said frame and pivotally connected to the respective doors for automatically, independently and selectively controlling the entire opening movement of the respective door during tilting toward the side adjacent said door and for positively closing the same during the return of the body from its tilted position, said mechanisms including means for permitting the door to yield upon encountering an obstruction.

In testimony whereof, I affix my signature.

HENRY FORT FLOWERS.